March 19, 1968

C. P. CRAMPTON 3,373,666

BATCH DELIVERY MECHANISM

Filed March 4, 1965

INVENTOR.
CHARLES P. CRAMPTON
BY
J. Warren Kinney, Jr.
ATTORNEY

March 19, 1968  C. P. CRAMPTON  3,373,666
BATCH DELIVERY MECHANISM

Filed March 4, 1965  5 Sheets-Sheet 5

INVENTOR.
CHARLES P. CRAMPTON
BY
J. Warren Kinney Jr.
ATTORNEY

United States Patent Office 3,373,666
Patented Mar. 19, 1968

3,373,666
BATCH DELIVERY MECHANISM
Charles P. Crampton, Hamilton, Ohio, assignor to The Hamilton Tool Company, Hamilton, Ohio, a corporation of Ohio
Filed Mar. 4, 1965, Ser. No. 437,087
16 Claims. (Cl. 93—93)

ABSTRACT OF THE DISCLOSURE

The machine is adapted to advance parcels of paper sheets deposited in echelon fashion upon a multiple-belt endless conveyor, and includes a counter-controlled stop finger which dips toward the conveyor periodically to intercept the leading parcel of a group of parcels, stopping the group while the conveyor continues to advance. While the group is thereby held immobile by the stop finger, one or more elongate lift rails are elevated between the parallel belts of the conveyor, to lift the parcels slightly above the level of the conveyor surface which normally supports the parcels, thereby displacing the stopped parcels from the advancing influence of the conveyor. The parcels pile up against the stop finger to an extent determined by the counter, thereby to produce a stack containing a predetermined number of parcels; and upon completion of the stack the stop finger is withdrawn, and the lift rails are lowered, permitting the parcels now in stacked formation to once again rest upon the moving conveyor for transport toward the discharge end of the conveyor.

---

This invention relates to a batch delivery mechanism and method for use with collators of paper sheets or the like, emanating usually from a rotary web cut-off machine or other source of sheets delivered continuously. The device of the invention may be employed, for example, to receive single or multiple printed forms delivered in rapid succession by a cut-off machine, arrange the forms in echelon fashion upon a conveyor, and compile the forms into batches each containing a predetermined number of forms. In many instances, the forms delivered by the cut-off machine consist of paper laminates interspersed with copy sheets, usually carbonized, and maintained in thin stack formation by means of glued edges, or otherwise. Such stacks may be accurately counted and compiled in uniform batches at high speed, by the device of the present invention.

An object of the invention is to provide a batch delivery mechanism of the character stated, which is highly reliable and efficient in rapid operation, thereby ensuring maximum uninterrupted production on a profitable basis.

Another object of the invention is to provide in a batch delivery mechanism of the character referred to, a simple and durable arrangement of components which may easily be maintained in condition for uninterrupted rapid operation, with great efficiency and accuracy.

Another object is to facilitate and minimize the amount and extent of human labor required for the rapid and accurate batching and handling of forms or sheets.

Another object is to provide an improved batch delivery mechanism which is compact, dependable, and free of injurious vibration.

A further object is to provide an improved method of batching flat paper parcels incident to advancement upon a conveyor.

The foregoing and other objects are attained by the means described herein and as illustrated upon the accompanying drawings, in which.

Figure 1:
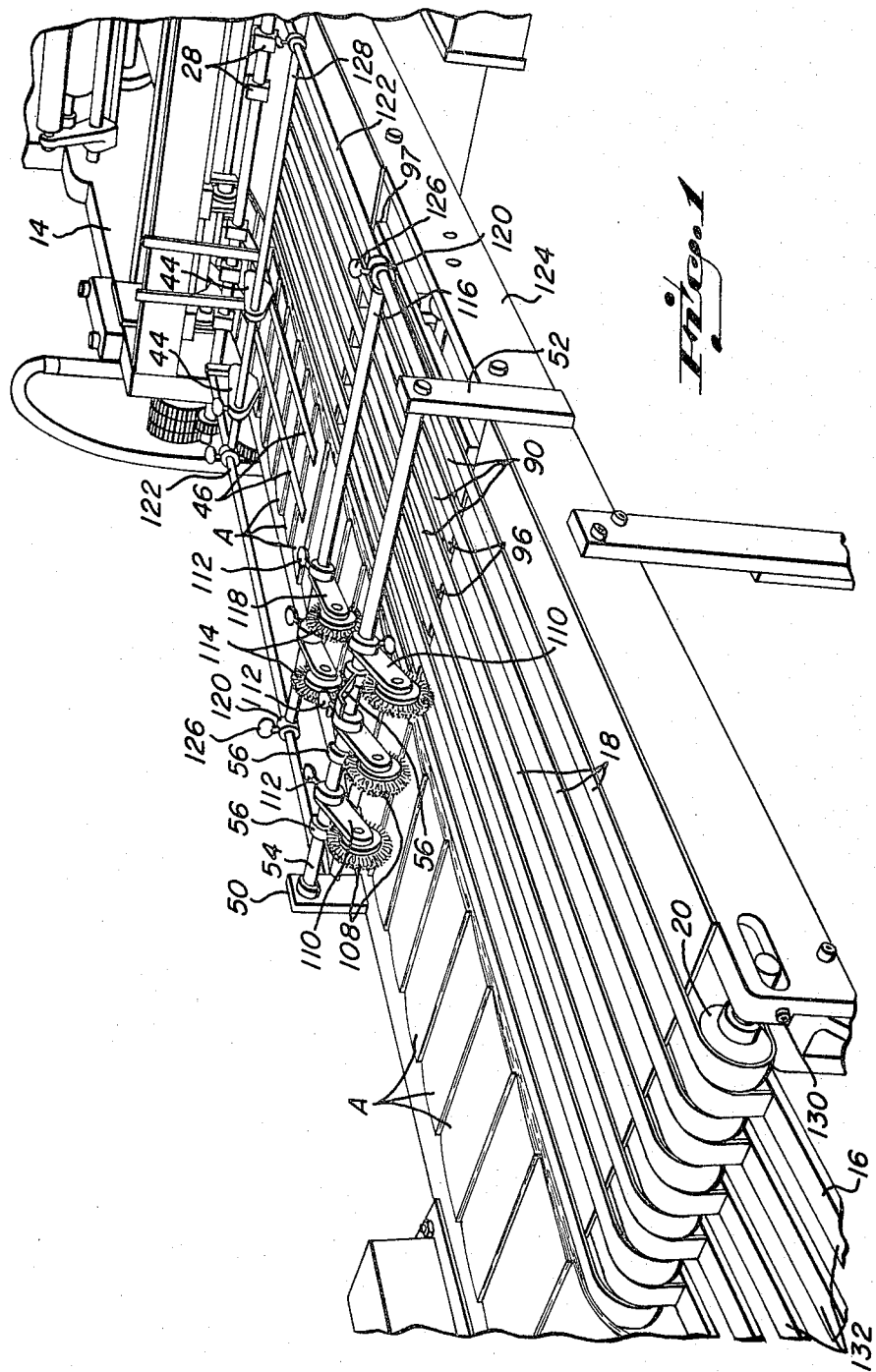
FIG. 1 is a perspective side view of a collator embodying the present invention.
Figure 2:
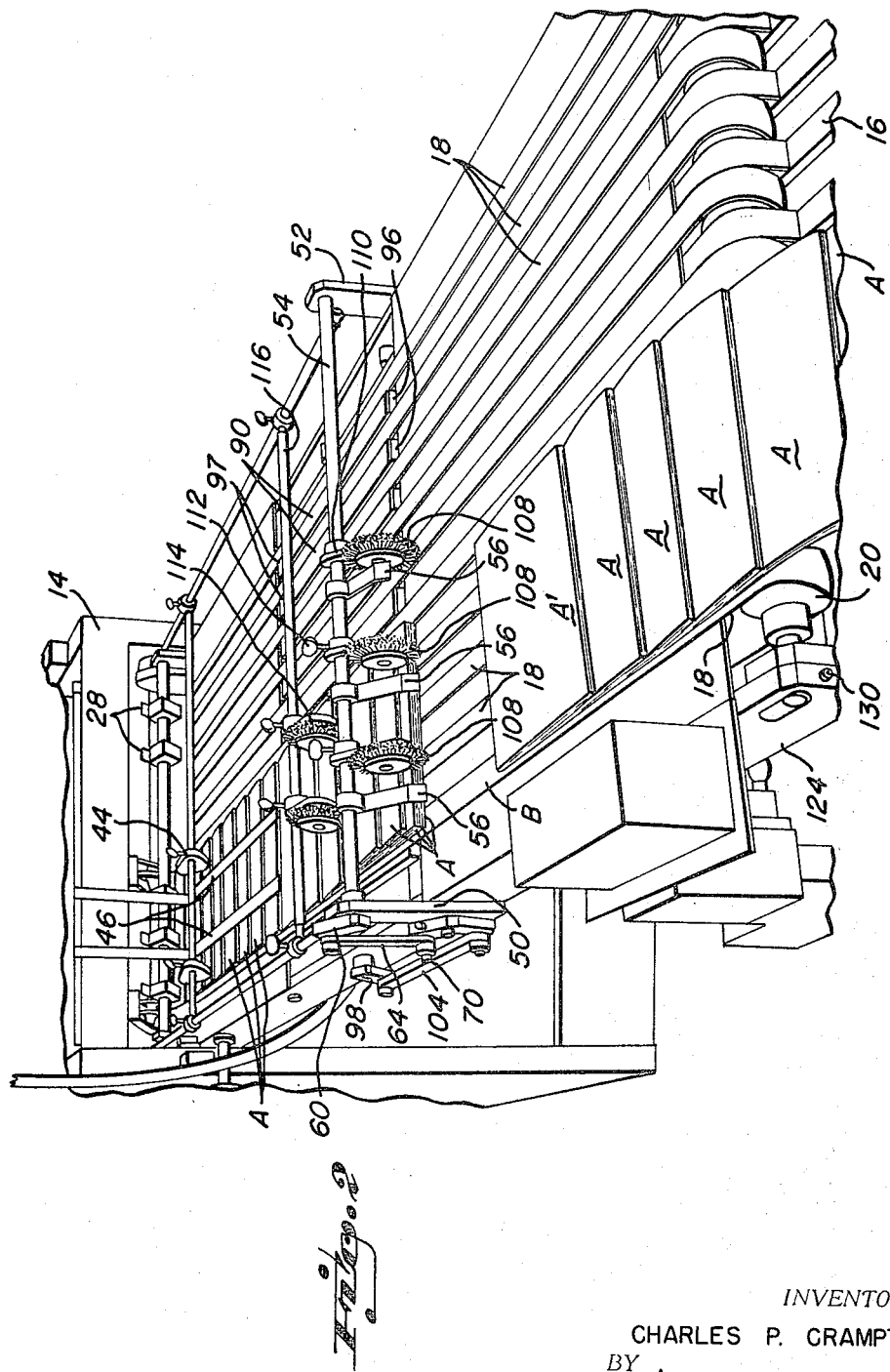
FIG. 2 is a perspective view showing the opposite side of the machine.

Referring to FIGS. 1 and 2, the apparatus therein shown comprises in general, a mechanical unit 14 which operates upon a continuous web of paper to cut the web into individual parcels A, and to deposit the parcels upon a conveyor in overlapping or echelon fashion, as shown. Each parcel A may be constituted of one or more paper sheets, which may be printed forms or the like. For the purposes of the instant disclosure, and with no intention to limit the present invention, each parcel A may be regarded as a thin stack of several sheets held together in coinciding relationship by adhesive means applied to the sheet margins, so that each parcel constitutes an integrated body capable of separate handling.

The conveyor carrying the overlapped parcels A, operates continuously and at high speed, to deliver the parcels to a tray 16 at the delivery end of the machine, whereon the parcels pile up as a column or stack, to be removed by an attendant at intervals.

The general progress of the parcels as above related is old practice in the collating art, and the machinery required for so advancing the parcels to the delivery end of the collator is well known. The present invention, however, incorporates means intermediate the cut-off unit 14 and the delivery tray 16, for temporarily interrupting the flow of parcels as suggested by FIG. 2, so that a gap B in the continuity of flow occurs, thereby to establish a succession of batches each containing a predetermined number of parcels. Referring to FIG. 2, the six parcels A in the foreground of the drawing figure, constitute the last few of a stack piling up on tray 16. The succeeding parcels shown beyond the rotary brushes at the middle of FIG. 2, constitute the leading parcels of a new stack to be compiled upon the tray. In practice, the first batch may be removed from the tray before the second batch begins to pile up thereon, this being usually a hand operation performed by an attendant, or in some cases, an automatic transfer of batches from the tray to a suitable receiver may be incorporated.

Tray 16 may be a jogger, or a simple tray constructed customarily of spaced slats as shown, all of which is immaterial to the present invention.

The parcel conveyor may comprise a plurality of spaced parallel belts 18 trained over pulleys 20 at opposite ends of the machine, with means provided at cut-off unit 14 for driving those pulleys which are adjacent thereto (FIG. 7), and advancing the conveyor belts at a high rate of speed. Thus, the parcels A while resting upon the belts, are advanced toward tray 16.

Figure 7:
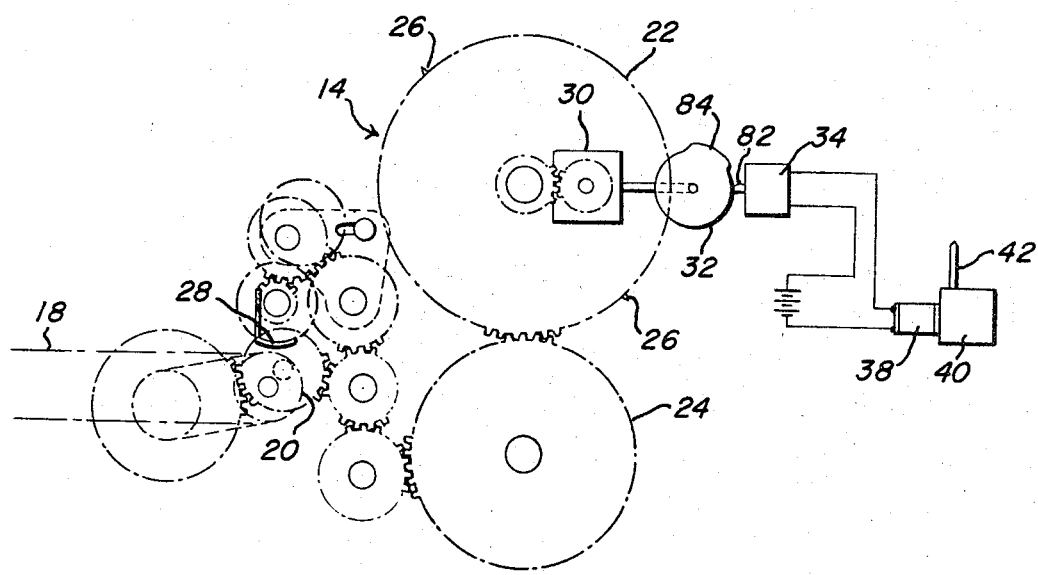
FIG. 7 is a schematic view of the principal parts of a rotary cut-off unit that may be associated with the collator, including control means operative by the unit.

The cut-off unit 14, shown schematically in FIG. 7, may include a rotary cut-off cylinder 22 and an anvil cylinder 24, the cut-off cylinder carrying one or more knives 26 to sever a continuous web fed between the cylinders from right to left in FIG. 7. The knives are so spaced apart upon cylinder 22, as to produce parcels such as A of predetermined length. The severed parcels of the web, upon leaving the knives 26, are introduced to a mechanism including suitable grippers, retarding rolls, and knock-down fingers 28, all of which cooperate in known manner, to deposit the severed sheets or parcels upon the moving conveyor belts 18 in overlapped or echelon relationship as suggested by FIGS. 1, 2 and 5.

The cut-off cylinder 22, or some other element moving in synchronism therewith, has associated therewith suitable means for intermittently actuating a pneumatic cylinder 23 (FIG. 5), or equivalent device, which controls the flow of parcels A to produce a gap or interruption of the parcel flow as depicted by FIG. 2. By way of example, the shaft or hub of cylinder 22 may drive a parcel counter 30, which in turn rotates a cam 32 or equivalent means for actuating an electric switch 34. The switch may be wired to the solenoid 38 of a solenoid-operated valve 40 controlling a pressure medium, such as compressed air, which by way of a flexible conduit 42, enters and actuates the pneumatic cylinder 23.

Counter 30, or cam 32, preferably is adjustable to induce actuation of control cylinder 23 upon advancement of any predetermined or selected number of parcels by conveyor 18. Thus, the number of parcels constituting a batch deposited upon delivery tray 16, may be varied as desired.

The reference numerals 44 and 46 in FIGS. 1 and 2, indicate sheet retarders and depressers common to machinery for moving and collating paper sheets in overlapping formation. The retarders generally are adjustable for varying the amount of overlap, and for controlling disposition of sheets of different sizes upon the conveyor belts.

Figure 5:
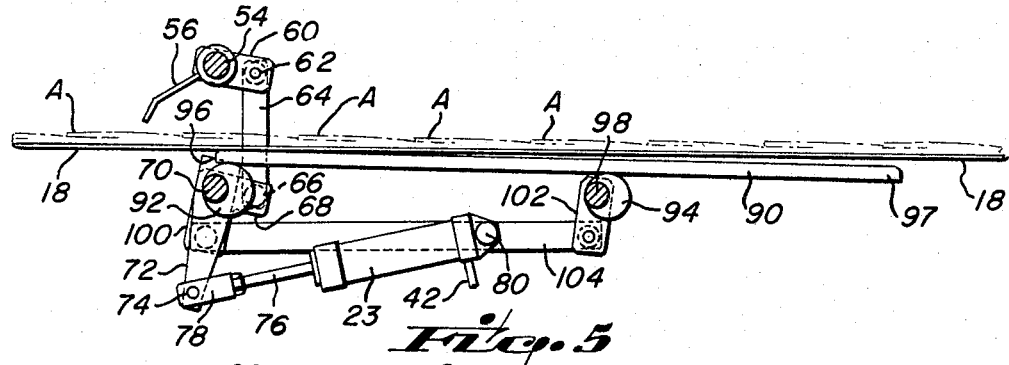
FIG. 5 is a cross-sectional detail view illustrating structure shown in elevation at the middle portion of FIG. 4.
Figure 6:
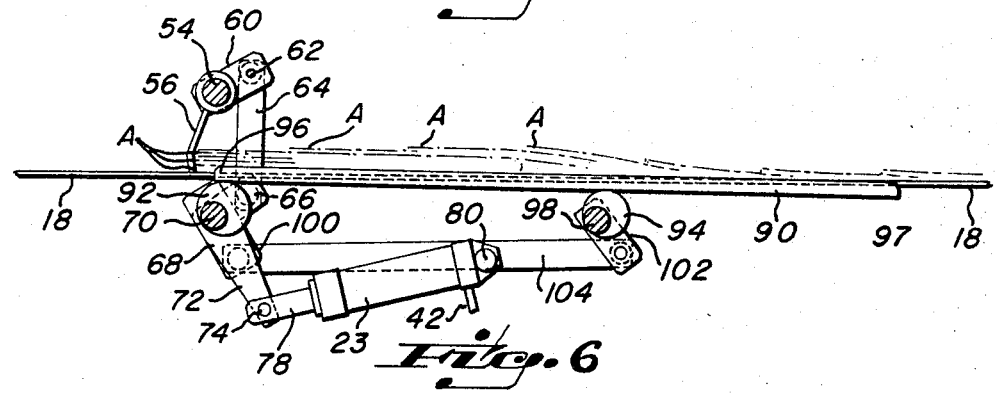
FIG. 6 is a view similar to FIG. 5, showing parts thereof in an alternative relationship.

Attention is now directed to FIGS. 2, 5 and 6, which detail the means for initiating batching of parcels A as herinbefore mentioned. To opposite sides of the conveyor frame, intermediate the opposite ends of the conveyor, are secured a pair of upright fixed posts 50 and 52, supporting opposite ends of a rock shaft 54. The rock shaft carries a plurality of stop fingers 56 adapted, upon rocking of the shaft, to move into the parcel-intercepting position of FIG. 6, from a normally inoperative raised position depicted by FIG. 5. The fingers are arranged upon shaft 54 transversely thereof, and each may be rotationally adjustable upon the shaft. One of the fingers 56 upon FIG. 2 is shown rotated upon shaft 54 to a raised position of non-use.

Shaft 54 may be rocked to elevate and lower the fingers 56, by action of the pneumatic cylinder 23. As best illustrated by FIGS. 5 and 6, shaft 54 carries an arm 60 having an end pivot 62 to which is attached one end of a link 64. The opposite end of said link may be pivoted, as at 66, to the outer end of an arm 68, which arm 68 is fixed to a rockable camshaft 70. Said camshaft may carry an operating lever 72 fixed thereon, and having an end pivot 74 to which is operatively connected the outer end of piston rod 76. The connection of the piston rod to pivot 74 may be effected by means of an adjustable clevis 78.

In the embodiment illustrated, pneumatic cylinder 23 is normally charged with compressed air at 42, to extend the piston rod 76 as in FIG. 5, thereby rotating camshaft 70 in clockwise direction. This effects a similar rotation of rock shaft 54, through link 64, to elevate the fingers 56. It will be understood that the rear end of cylinder 23 is pivoted at 80 upon a stationary part of the machine frame.

Figure 3:
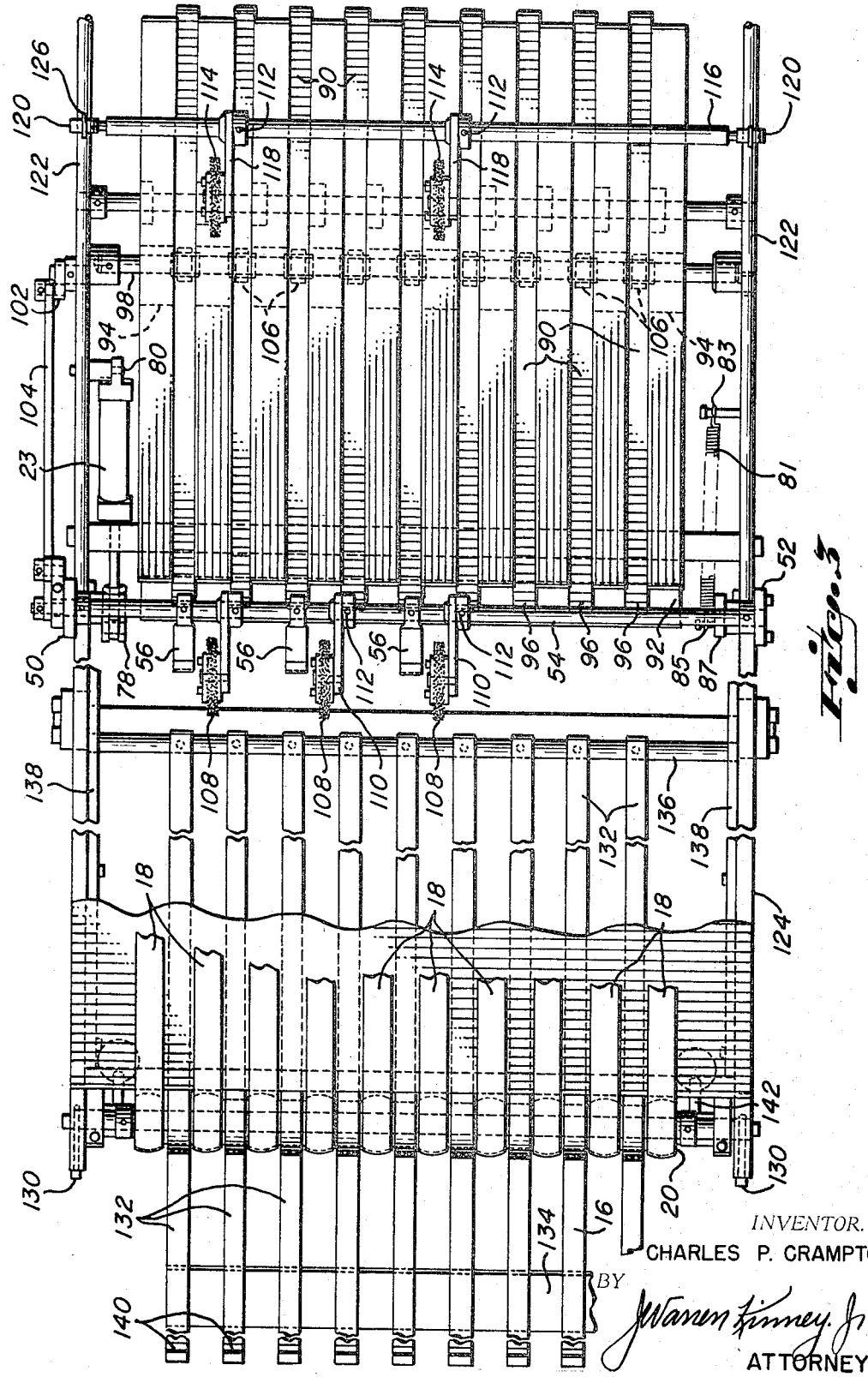
FIG. 3 is a top plan view of the collator, parts broken away, and omitting the sheet feeder unit.
Figure 4:
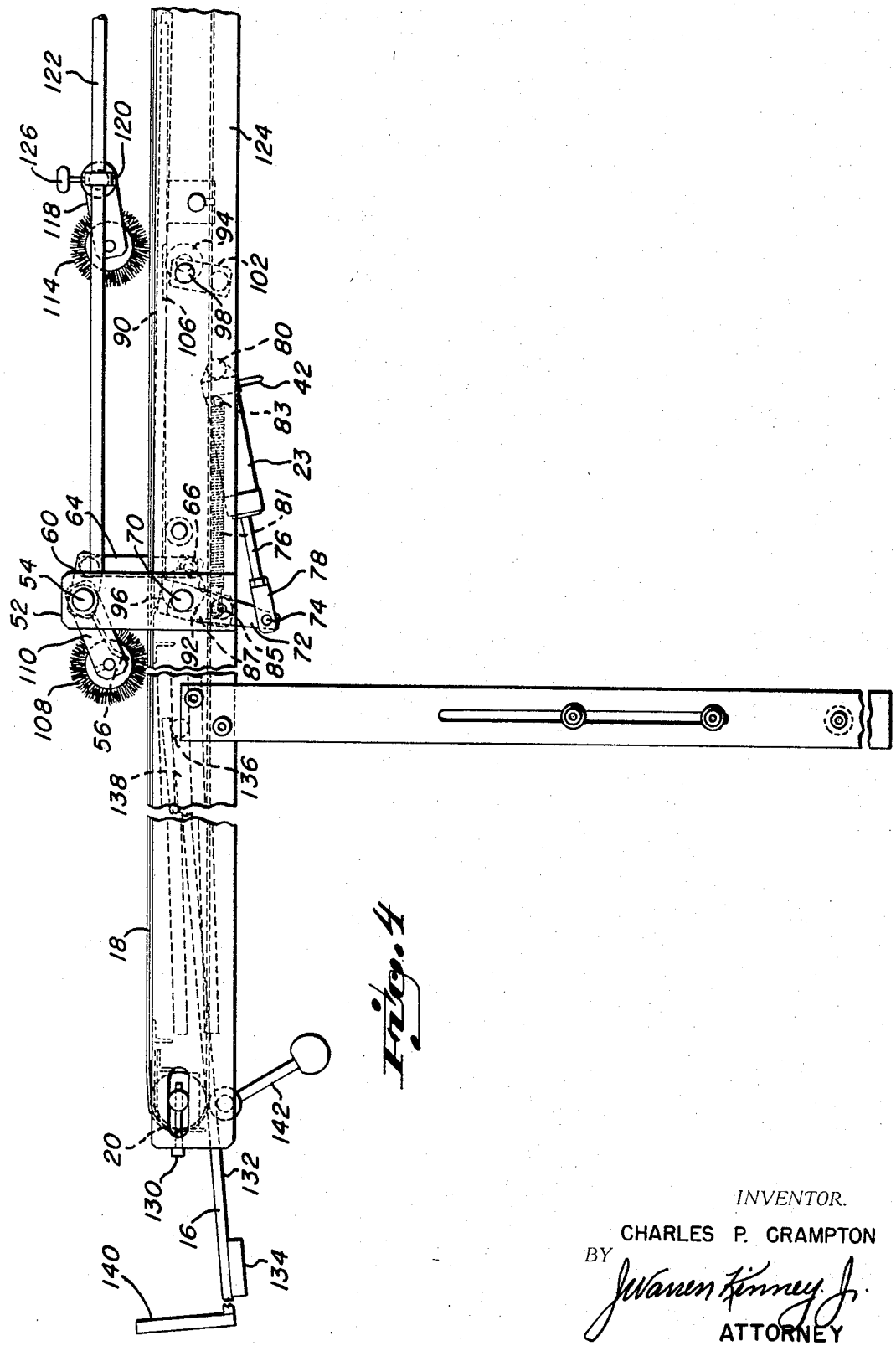
FIG. 4 is a side elevation of the delivery end of the collator showing the batch delivery mechanism of the invention.

The numeral 81 denotes a spring one end of which is anchored as at 83 to the machine frame, the opposite end of which is anchored at 85 to the free end of an arm 87 fixed upon shaft 70, FIGS. 3 and 4. Spring 81 has been provided to compensate for application of an uneven load applied to the air cylinder.

Fingers 56 are controlled by air cylinder 23 which in turn is controlled through a two-way valve. When the lobe 84 of cam 32 depresses the actuating button 82 of switch 34, the air is directed to the side of the air cylinder that turns shafts 70 and 54 in counter clockwise direction thereby lowering fingers 56 to the FIG. 6 position. When lobe 84 releases button 82 of switch 34 the air is directed to the opposite side of the air cylinder thereby raising fingers 56 to the elevated position of FIG. 5. The length of lobe 84 controls the number of parcels to pile up behind fingers 56. Lobe 84 is adjustable thereby permitting the number of parcels collected to be changed.

Fingers 56 will remain in the lowered position of FIG. 6 until the supply of air to cylinder 23 is restored. The supply of air to the cylinder may be maintained so long as the lobe 84 of cam 32 is free of contact with the actuating button 82 of switch 34. When the lobe 84 depresses button 82, the switch contacts may be closed to complete an electric circuit through the coil of solenoid 38, resulting in actuation of valve 40 to terminate flow of air to cylinder 23. Spring 81 thereupon will act to rotate shafts 70 and 54 in counter-clockwise direction, to lower the fingers 56 while at the same time moving piston rod 76 to the retracted position of FIG. 6. Then as cam lobe 84 moves past and off of the switch button 82, the circuit of solenoid 38 will be broken, permitting valve 40 to again supply compressed air to cylinder 23 for elevating the fingers 56 to the FIG. 5 position. As will be readily understood, valve 40 may be biased toward open position by means of a built-in spring or otherwise.

The FIG. 7 arrangement of counter 30, cam 32, valve 40, and the electrical controls shown, are to be considered exemplary only, since various equivalent means for the control of cylinder 23 will at once suggest themselves in the light of the instant disclosure. For example, the control means might easily be made purely mechanical, or purely electrical, within the skill of the machine designer.

With further reference to the means for initiating batching of parcels A, attention is directed to the lift rails 90 which extend from the region of shaft 70 a limited distance toward cut-off unit 14. The lift rails may be in the form of elongate straight bars located between the individual belts of conveyor 18. Said rails normally rest at an elevation below the level of conveyor 18, so as not to interfere with the advancement of parcels A resting upon the moving belts of the conveyor.

Lift rails 90 are adapted to be elevated in unison to a level above the conveyor belts 18, whenever the stop fingers 56 are lowered to intercept parcels as in FIG. 6. By elevating the lift rails while the fingers are lowered parcels A approaching the fingers are removed from the advancing influence of the conveyor belts and are permitted to pile up behind the fingers 56 as shown in FIG. 2, thereby to provide a gap at B between the parcels stopped by the fingers, and the preceding parcels passing onto tray 16. Upon formation of a suitable gap B, fingers 56 will be elevated to release the parcels compiled thereby, and at the same time the lift rails will be lowered beneath the level of belts 18, to replace the parcels upon the moving belts with immediate resumption of the parcel advancement toward tray 16.

Elevating and lowering of lift rails 90 may be accomplished by means of cams 92 and 94, upon which the lift rails are supported. Cam 92, which is closest to shafts 54 and 70, is shown in FIG. 3 as a cylinder eccentrically mounted upon shaft 70. Cam 92 is fixed upon shaft 70, so that rotation of said shaft causes the cam to elevate all of the lift rails at their trailing ends 96, from the lowered position of FIG. 6 to the elevated position of FIG. 5.

The leading end portions 97 of lift rails 90, receive support from the cam 94 upon which they rest. Cam 94 may be in the form of a long cylinder eccentrically mounted upon an auxiliary rock shaft 98 disposed in spaced parallelism with shaft 70 and rockable therewith. As FIGS. 5 and 6 clearly indicate, rails 90 rest upon cams 92 and 94 at a slight inclination, so that the lift exerted upon the approaching parcels A increases progressively in the direction of the rail ends 96. It is desirable that the amount of inclination of rails 90 be adjustable for orderly compilation of the parcels at fingers 56, and for that reason the cam 94 is mounted upon shaft 98 for rotational adjustment relative to said shaft. Once adjusted, cam 94 may be fixed upon shaft 98.

Shafts 70 and 98 may be caused to rock in unison, by providing them with fixed arms 100 and 102, respectively, pivotally connected at their ends by means of a link 104. Thus, action of cylinder 23 imparts movement to both cams 92 and 94, all of the lift rails 90, and the stop fingers 56. It may be noted here that cams 92 and 94 are of sufficient length to approximately span the conveyor constituted of the belts 18. In FIGS. 3 and 4, the numerals 106 indicate spacer and wear plates mounted on the lift rails 90.

When counter 30 initiates an operation of pneumatic cylinder 23 to lower the stop fingers 56, the fingers will necessarily contact the upper surface of one parcel, before other parcels begin to pile up behind the fingers to form gap B. Such one parcel, being too far advanced for interception by the fingers, will be expected to associate itself with the stack of parcels that has begun to form upon tray 16. That is, such one parcel which has escaped interception, is to become the final or uppermost parcel forming the stack upon tray 16. It is identified as parcel A1 upon FIG. 2.

In order to ensure that parcel A1 will extricate itself from beneath the stack undergoing formation behind fingers 56, and properly associate itself with the stack undergoing formation upon tray 16, there is provided one or more depressers or brush wheels 108 adapted to yieldingly urge said parcel firmly upon the moving belts 18 at one or more locations beyond the trailing ends 96 of lift rails 90. These brushes or depressers 108 may be rotatably supported upon arms 110 clamped or otherwise mounted upon rock shaft 54, so as to perform their function at substantially the same instant that fingers 56 begin their parcel-arresting and compiling function. The arms 110 preferably are subject to adjustment rotationally upon shaft 54, as by means of clamp screws 112 or the like, for best performance. Screws 112 normally are tightened so as to fix the arms 110 relative to shaft 54.

FIGS. 1, 3 and 4 clearly indicate that the brush wheels 108 are so disposed beyond the trailing ends 96 of the lift rails, that the compiling of parcels by fingers 56 will suffer no interference from the brush wheels. The point of contact between a brush wheel and a final parcel preceding the stop fingers, should occur slightly behind the fingers in most cases. The brush wheel may be in the form of a centrally apertured disc having radial bristles of wire or other stiff material. Each brush wheel is adapted for rotation as it contacts any parcels advanced by conveyor belts 18.

Brush wheels 114 similar to those at 108, may be supported upon a non-rotatable shaft 116 spanning the width of the conveyor at a location above the lift rails 90, to yieldingly depress the parcels A as they advance along the rails. Said wheels 114 exercise control over the compilation of parcels stopped by fingers 56, by governing inertia of the parcels when ascending the inclined upper faces of the lift rails. The brush wheels 114 may be rotatably mounted upon the free ends of arms 118, which arms may be rotationally adjustable about shaft 116 to regulate pressure of contact of the wheels upon the parcels below. Shaft 116 may carry at its opposite ends a pair of sliders 120 adjustable along the length of support rods 122 which extend lengthwise of the machine frame 124, for adjustably locating brush wheels 114 lengthwise of lift rails 90. The sliders may be clamped to rods 122 at selected locations by means of thumb screws 126 or equivalent fasteners. The same rods 122 may adjustably support the parcel retarders 44 carried by transverse bar 128.

Adjustable means 130 on frame 124 may be provided for adjusting the tension of conveyor belts 18, by shifting the roll assembly 20 bodily lengthwise of the machine frame.

As best illustrated by FIGS. 3 and 4, the parcel receiving tray 16 may comprise a multiplicity of elongate parallel bars 132 maintained in spaced relation at their opposite ends by cross-pieces 134 and 136. Cross-piece 136 may have its opposite ends slidable in inclined ways 138 extending lengthwise of the machine frame at opposite sides thereof, enabling the tray to be shifted lengthwise for varying the distance between the tray backstop members 140 and the adjacent end of conveyor 18. By this means, the effective length of the tray may be varied to accommodate parcels A having different length dimensions. Also, by reason of the inclination of ways 138, the elevation of tray 16 may be varied as the tray is shifted lengthwise of the machine frame. The numeral 142 indicates a clamp operative to fix the tray in adjusted positions.

By means of the present invention, a rapidly advancing succession of parcels or sheets A may be delivered as uniform batches or stacks upon the receiving tray, with the parcels or sheets of each batch accurately pre-counted and arranged for easy removal from the tray, free of confusion and error. The means employed for the purpose is virtually foolproof and trouble-free, so that continuous and efficient operation of the machine is assured.

It is to be understood that various modifications and changes may be made in the structural details of the apparatus, within the scope of the appended claims, without departing from the spirit of the invention.

What is claimed is:

1. Apparatus for batching flat paper parcels, comprising in combination: a rapidly movable parallel-belt type conveyor having a receiving end and a delivery end; means near the receiving end for depositing parcels continuously upon the conveyor in parcel-overlapping relationship; means at the delivery end of the conveyor for stacking the parcels flatwise one upon another; and parcel stop means intermediate said ends of the conveyor for temporarily arresting movement of some of the parcels, to provide a gap in the flow of parcels toward the stacking means, said parcel stop means comprising a movable stop finger movable into intercepting motion-stopping relationship with the parcels advanced by the conveyor, and means operative while the stop finger holds the parcels immobile against advancement with the conveyor, for temporarily removing the stopped parcels from the advancing influence of the conveyor.

2. Apparatus as set forth in claim 1, wherein the combination includes means to activate the parcel-stop means, upon passage of a predetermined number of parcels past a given point of parcel advancement adjacent to the parcel deposit means said temporarily operative means comprising a parcel lifting member projectable between the belts of the conveyor to raise the stopped parcels from substantial frictional contact with the conveyor.

3. Apparatus for batching flat paper parcels, comprising in combination: a continuously movable parallel-belt type conveyor having a receiving end and a delivery end and parcel-supporting reaches intermediate said ends; parcel feed means near the receiving end for depositing parcels continuously upon the conveyor in parcel-overlapping relationship; means at the delivery end of the conveyor for stacking the parcels flatwise one upon another; parcel stop means intermediate the ends of the conveyor for temporarily arresting advancement of some of the parcels while the conveyor remains in continuous operation, thereby to provide a gap in the flow of parcels toward the stacking means; a counter for counting the number of parcels deposited upon the conveyor by the parcel feed means; and means associated with the counter for activating the parcel stop means to produce the gap aforesaid, upon the counting of a predetermined number of parcels by said counter; means included in the parcel stop means, for performing a limited pre-stacking of parcels in advance of delivery to the final stacking means; and means responsive to operation of the counter, for temporarily lifting from the conveyor the parcels undergoing pre-stacking, said lifting means comprising a plurality of substantially co-planar lift rails extending in the general direction of conveyor movement and located between the parallel belts of the conveyor, said rails being disposed normally at a level beneath the parcel-supporting reaches of the conveyor belts; and means for elevating said lift rails between the conveyor belts to a position above the level of the parcel-supporting reaches thereof, for lifting and arresting advancement of parcels advancing onto the rails during the period of pre-stacking.

4. Apparatus as set forth in claim 3, wherein the combination includes means to depress parcels against the upper reaches of the conveyor belts, at the approximate location of the parcel stop means aforesaid.

5. Apparatus for batching flat paper parcels, comprising in combination: a continuously movable parallel-belt type conveyor having a receiving end and a delivery end; parcel feed means near the receiving end for depositing parcels continuously upon the conveyor in partially overlapping relationship; means at the delivery end of the conveyor for finally stacking the parcels flatwise one upon another; stop means intermediate the ends of the conveyor for temporarily stopping advancement of some of the parcels while the conveyor remains in continuous operation, thereby to form a gap in the flow of parcels toward the final stacking means; a counter for counting the number of parcels deposited upon the conveyor by the parcel feed means; means associated with the counter for activating the parcel-stopping means to produce the gap aforesaid, upon the counting of a predetermined number of parcels by said counter; means included in the parcel stop means, for performing a limited pre-stacking of parcels in advance of delivery to the final stacking means; and means responsive to operation of the counter, for temporarily lifting from the conveyor the parcels undergoing pre-stacking, said lifting means comprising a plurality of lift rails extending in the general direction of conveyor movement, said rails being inclined upwardly relative to the plane of the conveyor in the direction of the delivery end; and means for elevating the uppermost ends of the inclined rails between the conveyor belts to a position above the plane of the conveyor, for progressively lifting and arresting advancement of parcels advancing onto the rails during the period of pre-stacking.

6. Apparatus for batching flat paper parcels, comprising in combination: a continuously movable conveyor comprising a plurality of spaced parallel coplanar belts movable in unison, said conveyor having a receiving end and a delivery end; parcel feed means near the receiving end for depositing parcels continuously upon the conveyor in partially overlapping relationship; means at the delivery end of the conveyor for finally stacking the parcels flatwise one upon another; stop means intermediate the ends of the conveyor for momentarily stopping advancement of some of the parcels while the conveyor remains in continuous operation, thereby to form a gap in the flow of parcels toward the final stacking means; actuating means to activate the parcel stop means upon passage of a predetermined number of parcels past a given point of parcel advancement; means included in the parcel stop means, for performing a limited pre-stacking of parcels in advance of delivery to the final stacking means; and means for lifting from the conveyor the parcels undergoing pre-stacking, said lifting means comprising a plurality of elongate coplanar lift rails extending in the general direction of conveyor movement said rails being inclined upwardly in the direction of the delivery end of the conveyor, at a slight angle to the plane of the conveyor; and means for elevating the uppermost ends of the inclined rails between the conveyor belts, to a position above the plane of the conveyor, for progressively lifting and arresting advancement of parcels advanced by the conveyor onto the inclined rails during the period of pre-stacking.

7. Apparatus as set forth in claim 6, wherein the combination includes means for selectively varying the degree of inclination of the lift rails.

8. Apparatus for batching flat paper parcels, comprising in combination: a stationary frame; a continuously movable conveyor on the frame, comprising a plurality of spaced parallel coplanar belts movable in unison, said conveyor having a receiving end and a delivery end; parcel feed means near the receiving end for depositing parcels continuously upon the conveyor in partially overlapping relationship, with leading ends of successive parcels upwardly exposed upon the stream of parcels conveyed; means at the delivery end of the conveyor for finally stacking the parcels flatwise upon one another; stop means intermediate the ends of the conveyor for momentarily stopping advancement of some of the parcels while the conveyor remains in continuous operation; said stop means comprising a rock shaft, means on the frame supporting said shaft above and transversely of the conveyor for rocking movement, a stop finger fixed upon the rock shaft and having a free end movable toward and from the conveyor upon rocking of said shaft in opposite directions, means including a pneumatic cylinder for rocking the rock shaft, to dispose the free end of the stop finger into intercepting and non-intercepting relationship with the leading ends of parcels advanced by the conveyor, a plurality of elongate spaced and coplanar lift rails extending in the general direction of conveyor movement, means on the frame supporting said lift rails for vertical movement between the belts of the conveyor, with said rails inclined slightly upwardly in the direction of the delivery end of the conveyor, said rails having trailing ends disposed beneath the stop fingers, and leading ends extending toward the parcel feed means, the supporting means for the lift rails including means to elevate the trailing ends of the inclined rails to a position above the plane of the conveyor, for progressively lifting and arresting advancement of parcels advanced by the conveyor onto the inclined rails; and control means responsive to passage of a predetermined number of parcels past a given point on the frame for initiating actuation of the pneumatic cylinder to rotate the rock shaft and dispose the stop finger to parcel-intercepting position, and to substantially simultaneously elevate the lift rails.

9. Apparatus as set forth in claim 8, wherein the combination includes means located to press onto the moving conveyor, any non-intercepted parcel overlapped by those immobilized by the stop finger.

10. Apparatus for batching flat paper parcels, comprising in combination: a stationary frame; a continuously movable conveyor on the frame, comprising a plurality of spaced parallel coplanar belts movable in a common direction, said conveyor having a receiving end and a delivery end; parcel feed means near the receiving end for depositing parcels continuously upon the conveyor in partially overlapped relationship, with leading ends of successive parcels upwardly exposed upon the stream of parcels conveyed; means at the delivery end of the conveyor for finally stacking the parcels flatwise one upon another; stop means intermediate the ends of the conveyor, including a stop finger movable from a raised position, to a lowered position for intercepting the leading ends of the parcels and thereby stopping advancement thereof, a plurality of elongate spaced and coplanar lift rails extending in the general direction of conveyor movement, said rails having trailing ends disposed beneath the stop finger, and leading ends extending toward the parcel feed means, means normally supporting the lift rails beneath the conveyor level in position to be elevated between the conveyor belts to a level above said belts, thereby to lift parcels bodily from the conveying influence of the belts, said rails being inclined relative to the plane of the conveyor belts, with the trailing ends thereof at a higher elevation than the leading ends; and means responsive to passage of a predetermined number of parcels past a given point on the frame, for substantially simultaneously lowering the stop finger to parcel-intercepting position, and elevating the lift rails to remove from the conveying influence of the belts those parcels which rest upon the lift rails.

11. Apparatus as set forth in claim 10, wherein the combination includes pressing means operative upon lowering of the stop finger, to press onto the moving conveyor belts any non-intercepted parcel overlapped by parcels immobilized by the stop finger, said pressing means being located beyond the finger and the trailing ends of the lift rails, in the direction of the delivery end of the conveyor.

12. Apparatus for batching flat paper parcels, comprising in combination: a stationary frame; a continuously movable conveyor on the frame, comprising a plurality of spaced parallel coplanar belts movable in a common direction, said conveyor having a receiving end and a delivery end; parcel feed means near the receiving end for depositing parcels continuously upon the conveyor in partially overlapped relationship, with leading ends of successive parcels upwardly exposed upon the stream of parcels conveyed; means at the delivery end of the conveyor for finally stacking the parcels flatwise one upon another; stop means intermediate the ends of the conveyor, including a stop finger movable from a raised inoperative position, to a lowered operative position at which the finger intercepts the leading ends of parcels advanced by the conveyor, said finger being of such length as to stack a limited number of parcels one upon another, a plurality of elongate spaced coplanar lift rails extending in the general direction of conveyor movement, said rails having trailing ends disposed beneath the stop finger, and leading ends extending toward the parcel feed means, means normally supporting the lift rails beneath the conveyor level in position to be elevated between the conveyor belts to a level above said belts, thereby to lift parcels bodily from the conveying influence of the belts, said rails being inclined relative to the plane of the conveyor belts, with the trailing ends thereof at a higher elevation than the leading ends; means responsive to passage of a predetermined number of parcels past a given point on the frame, for substantially simultaneously lowering the stop finger to parcel-intercepting position, and elevating the lift rails to remove from the conveying influence of the belts those parcels which rest upon the lift rails; means located to press onto the moving conveyor belts any non-intercepted parcel overlapped by those immobilized by the stop finger; and means for adjustably varying the degree of inclination of the lift rails.

13. Apparatus as set forth in claim 12, wherein the combination includes means for yieldingly depressing and retarding advancement of parcels ascending the inclined lift rails.

14. The method of batching flat paper parcels, comprising: depositing such parcels continuously upon the receiving end of a rapidly advancing conveyor, with the parcels partially overlapping to expose upwardly the leading ends of successive parcels; providing at the delivery end of the conveyor a receiver upon which the parcels pile up one upon another; and intermittently momentarily intercepting a limited number of the advancing parcels at a location intermediate the opposite ends of the conveyor, to immobilize the intercepted parcels and produce a gap in the stream of parcels directed to the receiver, thereby to define separate batches of the parcels under advancement by the conveyor, said immobilizing of the intercepted parcels being accompanied by a lifting thereof from the conveyor to reduce frictional contact of the parcels upon the moving conveyor; and thereafter permitting the lifted parcels to return to full contact with the conveyor while at substantially the same time terminating the interception thereof.

15. The method of batching flat paper parcels, comprising: depositing such parcels continuously upon the receiving end of a rapidly advancing conveyor, with the parcels partially overlapping to expose upwardly the leading ends of successive parcels; intercepting and immobilizing the upwardly exposed leading ends of a limited number of the advancing parcels at a location intermediate the opposite ends of the conveyor, in performance of a limited pre-batching operation; then restoring the intercepted pre-batched parcels to the advancing influence of the conveyor, thereby to provide a gap in the stream of advancing parcels to define a succession of batches.

16. The method as set forth in claim 15, which includes as a final step, the self-compiling of the advancing articles by directing the leading ends thereof against a transverse stationary backstop located at the delivery end of the conveyor.

References Cited
UNITED STATES PATENTS 3,194,127  7/1965  Larsson _____ 93—93.3

FOREIGN PATENTS 884,063  12/1961  Great Britain.

BERNARD STICKNEY, *Primary Examiner.*